US012695757B2

(12) United States Patent
Patel et al.

(10) Patent No.: US 12,695,757 B2
(45) Date of Patent: Jul. 28, 2026

(54) AUTHENTICATED SECURE COMMUNICATIONS ACROSS DIFFERENT DEVICES

(71) Applicant: Capital One Services, LLC, McLean, VA (US)

(72) Inventors: Milind Patel, Frisco, TX (US); Syed Hussain, Little Elm, TX (US); Briana Vargas, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 212 days.

(21) Appl. No.: 18/333,731

(22) Filed: Jun. 13, 2023

(65) Prior Publication Data

US 2024/0422160 A1      Dec. 19, 2024

(51) Int. Cl.
*H04L 9/40* (2022.01)
*H04L 41/22* (2022.01)
(52) U.S. Cl.
CPC ............ *H04L 63/102* (2013.01); *H04L 41/22* (2013.01); *H04L 63/0853* (2013.01)
(58) Field of Classification Search
CPC ......... H04L 41/22; H04L 41/24; H04L 41/28; H04L 41/30; H04L 41/34; H04L 41/4522; H04L 41/5025; H04L 63/102; H04L 63/104; H04L 63/105; H04L 63/107
USPC ......................................... 709/220, 224–228
See application file for complete search history.

(56) References Cited

U.S. PATENT DOCUMENTS

| | | | |
|---|---|---|---|
| 8,180,704 B2 | 5/2012 | McQuaide, Jr. et al. | |
| 10,902,705 B1 * | 1/2021 | Rose ................... | H04L 63/0823 |
| 10,904,259 B1 * | 1/2021 | Rose ..................... | G06N 3/098 |
| 11,070,644 B1 * | 7/2021 | Teng ..................... | H04L 67/306 |
| 11,301,496 B2 * | 4/2022 | Margel ................ | H04L 63/0263 |
| 11,824,898 B2 * | 11/2023 | Kramar ................. | G06F 3/0482 |
| 11,979,990 B2 * | 5/2024 | Toba ..................... | C23C 18/165 |
| 2010/0011447 A1 * | 1/2010 | Jothimani ........... | G06F 21/6209 726/27 |
| 2013/0254856 A1 * | 9/2013 | Krishan ................ | H04L 63/083 726/6 |

(Continued)

FOREIGN PATENT DOCUMENTS

| | | | | |
|---|---|---|---|---|
| CA | 2811169 A1 * | 9/2010 | ........... | G06F 16/245 |
| CA | 2991073 A1 * | 1/2017 | ............. | G06Q 20/02 |

(Continued)

*Primary Examiner* — Khanh Q Dinh
(74) *Attorney, Agent, or Firm* — Harrity & Harrity, LLP

(57) ABSTRACT

In some implementations, a device may provide, to a user device associated with a user, a graphical user interface (GUI) associated with the platform. The GUI may include one or more fields associated with inputting account information associated with multiple accounts associated with the user and multiple entities. The device may receive, via the GUI, the account information associated with the multiple account types. The device may authenticate the account information with the platform. The device may receive, via the GUI, an account communication indicating a request to provide an action indication to one or more server devices associated with respective entities of the multiple entities. The device may provide, based on the account communication, the action indication to the one or more server devices associated with the respective multiple entities.

20 Claims, 9 Drawing Sheets

400

(56) References Cited

U.S. PATENT DOCUMENTS

| | | | | |
|---|---|---|---|---|
| 2014/0080319 A1* | 3/2014 | Sasajima | ................. | C23C 16/30 |
| | | | | 438/778 |
| 2016/0012465 A1* | 1/2016 | Sharp | .................. | G06Q 20/321 |
| | | | | 705/14.17 |
| 2016/0173683 A1* | 6/2016 | Abreu | .............. | H04M 3/42042 |
| | | | | 455/414.1 |
| 2016/0202442 A1* | 7/2016 | Hsieh | .................... | G02B 7/023 |
| | | | | 359/819 |
| 2017/0091658 A1* | 3/2017 | Matthiesen | ........... | H04L 63/102 |
| 2017/0265515 A1* | 9/2017 | Davila | .................... | A23P 20/20 |
| 2018/0316659 A1* | 11/2018 | York | ................... | H04L 63/102 |
| 2019/0278878 A1* | 9/2019 | Sawyer | ................ | G06F 21/602 |
| 2020/0097481 A1* | 3/2020 | Cosentino | .......... | G06F 16/2423 |
| 2021/0004454 A1* | 1/2021 | Chester | ................ | H04L 9/3213 |
| 2021/0174347 A1* | 6/2021 | Rose | ................... | H04L 63/0428 |
| 2021/0176340 A1* | 6/2021 | Rose | ................... | G06Q 20/405 |
| 2021/0226921 A1* | 7/2021 | Rose | .................. | H04L 63/0272 |
| 2022/0064601 A1* | 3/2022 | Mohamed | .......... | G01N 33/5082 |
| 2022/0159056 A1* | 5/2022 | Rose | ....................... | G06F 21/32 |
| 2022/0272095 A1* | 8/2022 | Joseph | ................ | G06F 3/0484 |
| 2022/0279022 A1* | 9/2022 | Kramar | .............. | H04L 41/0886 |
| 2024/0086803 A1* | 3/2024 | Lopez | ................. | G06Q 10/067 |

FOREIGN PATENT DOCUMENTS

| | | | | | |
|---|---|---|---|---|---|
| CA | 3007992 A1 | * | 12/2018 | ........... | G06Q 20/023 |
| EP | 2942995 A1 | * | 11/2015 | ............. | G06Q 20/36 |

* cited by examiner

100

105
Access a platform
to register account information

110
Registration request that
includes the account information

115
Registration confirmation

User
Device

Secure Gateway
Device

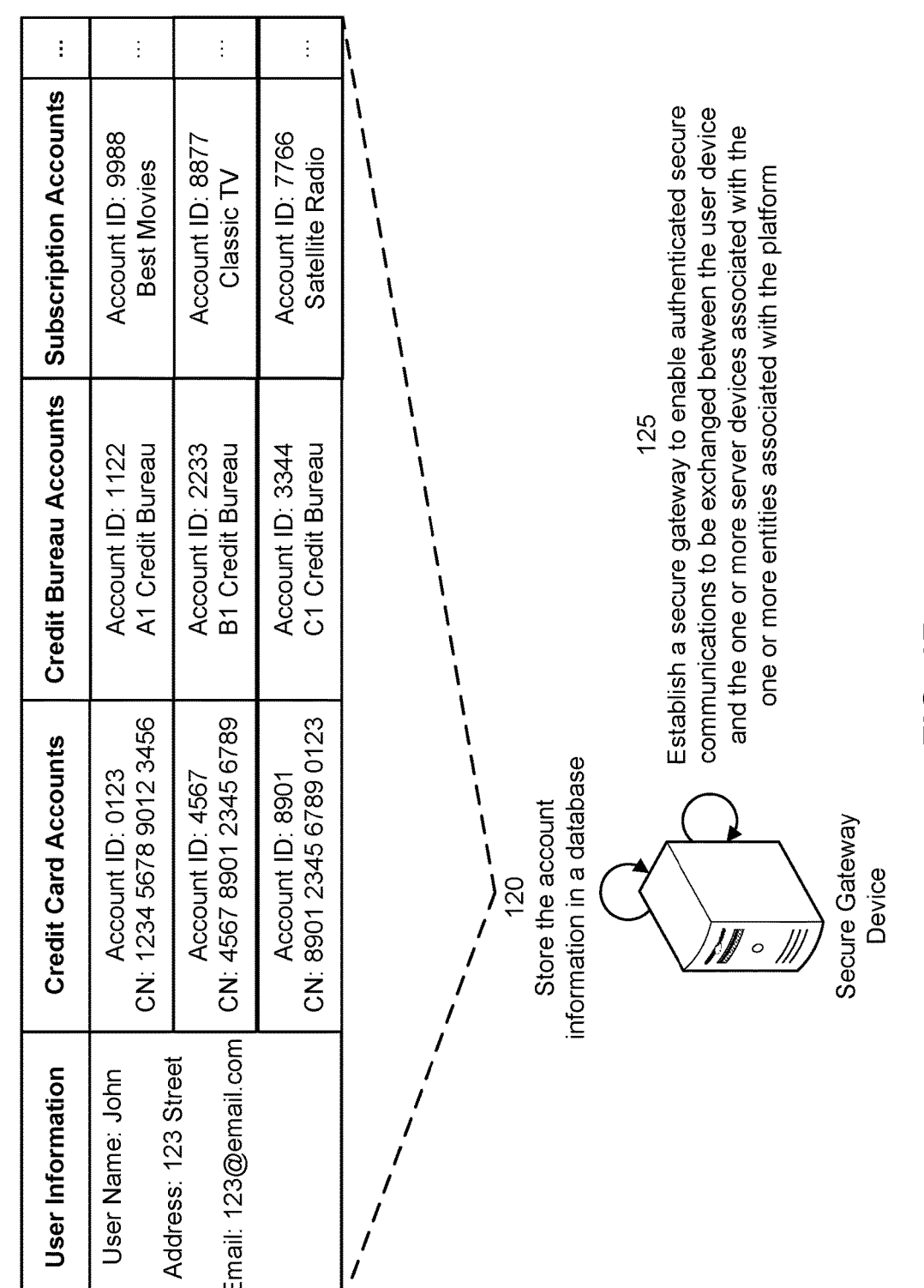

| User Information | Credit Card Accounts | Credit Bureau Accounts | Subscription Accounts | ⋮ |
|---|---|---|---|---|
| User Name: John<br><br>Address: 123 Street<br><br>Email: 123@email.com | Account ID: 0123<br>CN: 1234 5678 9012 3456 | Account ID: 1122<br>A1 Credit Bureau | Account ID: 9988<br>Best Movies | ⋮ |
| | Account ID: 4567<br>CN: 4567 8901 2345 6789 | Account ID: 2233<br>B1 Credit Bureau | Account ID: 8877<br>Classic TV | ⋮ |
| | Account ID: 8901<br>CN: 8901 2345 6789 0123 | Account ID: 3344<br>C1 Credit Bureau | Account ID: 7766<br>Satellite Radio | ⋮ |

100

120
Store the account
information in a database

125
Establish a secure gateway to enable authenticated secure
communications to be exchanged between the user device
and the one or more server devices associated with the
one or more entities associated with the platform Secure Gateway
Device

135
Indication of the GUI

140
Indication of a user input

User
Device

Secure Gateway
Device

145
Indication of a request

Server Device

200

AUTHENTICATED SECURE COMMUNICATIONS ACROSS DIFFERENT DEVICES

BACKGROUND

Authenticated secure communication systems may be associated with a process that enables communications between and/or among devices to be authenticated and remain confidential. Typically, authenticated secure communication systems use authentication techniques to verify identities of the devices associated with the communications and to verify that the information being exchanged via the communications is authentic. Additionally, authenticated secure communication systems typically use secure communication techniques, such as secure transmission protocols and/or cryptographic techniques, to ensure that the information being exchanged via the communications remains confidential and is accessible only in an authorized manner.

SUMMARY

Some implementations described herein relate to a system for enabling authenticated secure communications across different devices via a platform. The system may include one or more memories and one or more processors communicatively coupled to the one or more memories. The one or more processors may be configured to provide a graphical user interface (GUI) associated with enabling authenticated secure communications to be exchanged between a user device associated with a user and one or more server devices associated with one or more entities via the platform, wherein the GUI includes one or more fields associated with inputting information associated with one or more accounts associated with the user and respective entities from the one or more entities. The one or more processors may be configured to receive, from the user device, account information associated with the one or more accounts that is input via the GUI. The one or more processors may be configured to perform a registration procedure that enables the account information to be authenticated via the platform. The one or more processors may be configured to provide, to the user device, an indication of a set of action options, for display via the GUI, based on the account information. The one or more processors may be configured to receive, from the user device, a user input, via the GUI, that indicates a selection of one or more action options from the set of action options. The one or more processors may be configured to provide, to the one or more server devices associated with the one or more entities, an indication of the one or more action options.

Some implementations described herein relate to a method for enabling authenticated secure communications across different devices via a platform. The method may include providing, by a device and to a user device associated with a user, a GUI associated with the platform, wherein the GUI includes one or more fields associated with inputting account information associated with multiple account types associated with the user and respective multiple entities. The method may include receiving, by the device and via the GUI, the account information associated with the multiple account types. The method may include authenticating, by the device, the account information with the platform. The method may include receiving, by the device and via the GUI, an account communication associated with an account type of the multiple account types, wherein the account communication includes a request to provide an action option to one or more server devices associated with one or more entities of the respective multiple entities associated with the account type. The method may include providing, by the device and based on the account communication, an indication of the action option to the one or more server devices associated with the one or more entities.

Some implementations described herein relate to a non-transitory computer-readable medium that stores a set of instructions. The set of instructions, when executed by one or more processors of a device, may cause the device to receive, from a user device of a user, account information associated with multiple account types associated with the user and multiple entities. The set of instructions, when executed by one or more processors of the device, may cause the device to authenticate the account information. The set of instructions, when executed by one or more processors of the device, may cause the device to configure, based on the account information, a set of action options associated with the multiple account types and the multiple entities. The set of instructions, when executed by one or more processors of the device, may cause the device to receive, from the user device, an account communication associated with an account type of the multiple account types indicating a request to provide an action option from the set of action options, to one or more server devices that are associated with one or more entities of the multiple entities associated with the account type. The set of instructions, when executed by one or more processors of the device, may cause the device to provide the action option to the one or more server devices of the one or more entities of the multiple entities associated with the account type.

BRIEF DESCRIPTION OF THE DRAWINGS

FIGS. 1A-1F are diagrams of an example associated with systems and methods for enabling authenticated secure communications across different devices, in accordance with some embodiments of the present disclosure.

DETAILED DESCRIPTION

Figure 1A:
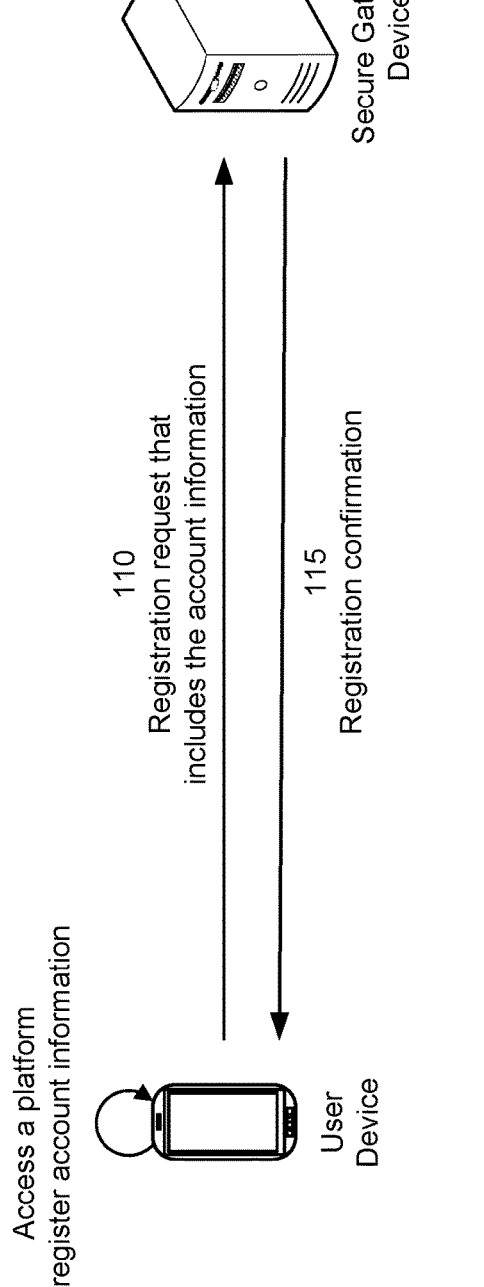

The following detailed description of example implementations refers to the accompanying drawings. The same reference numbers in different drawings may identify the same or similar elements.

Authenticated secure communication systems may be associated with a process that relies on authentication techniques and/or secure communication techniques to enable communications to be exchanged between devices in an authenticated and secure manner. For example, an authenticated secure communication system uses authentication techniques to verify identities associated with devices (e.g., devices providing and/or receiving communications) and/or to enable information being exchanged via the communications to be verified as authentic. As another example, the authenticated secure communication system typically uses secure communication techniques, such as using a secure communication protocol (e.g., a Transport Layer Security (TLS) protocol or a Secure Socket Layer (SSL) protocol) to enable encrypted communication between the devices, digital certificates and/or keys (e.g., associated with a Public Key Infrastructure (PKI)) to secure communications, and/or multi-factor authentication techniques to verify an identity associated with the devices and/or operators associated with the devices.

Typically, the authenticated secure communication system enables authenticated secure communications to be exchanged between two devices, such as a user device associated with a user and a server device associated with an entity. For example, when a person experiences a change in account information (e.g., changed account information) associated with an account that is managed through an entity, the user of the user device may request that the server device associated with the entity update the account associated with the user to include the changed account information.

In some cases, the changed account information may be associated with sensitive information associated with the user (e.g., personal information, confidential information, and/or protected information associated with the user, among other examples), and the authenticated secure communication system may enable the user device of the user and the server device associated with the entity to exchange authenticated secure communications with one another. For example, the user device may provide, and the server device may receive, an indication of a request to update the account to include the changed account information.

In some cases, the changed account information may be associated with multiple accounts associated with the user and multiple entities. However, because the authenticated secure communication system enables authenticated secure communications to be exchanged between two devices (e.g., between the user device of the user and the server device associated with the entity), the user of the user device typically establishes separate authenticated secure communication channels (e.g., via multiple authenticated secure communication systems) with the entities associated with the accounts (e.g., between the user device of the user and server devices associated with respective entities associated with the accounts) to provide an indication of the request to update the account to include the changed account information. In other words, each entity of the multiple entities may use one or more separate authenticated secure communication systems or channels to receive the changed information provided by the user device. This may consume resources (e.g., processing resources, memory resources, and/or network resources) associated with establishing the separate authenticated secure communication channels between the user device and each entity associated with the accounts associated with the changed account information. Additionally, tracking and/or managing each account associated with the changed account information can often be very difficult, which can potentially result in the user deciding to refrain from providing the changed account information to the entity and deciding not to request for the account associated with the changed account information.

This can lead to unauthorized use of the account and/or misuse of the account (e.g., if a credit card associated with the user is lost and the user does not report the credit card as lost with an entity that manages an account associated with the lost credit card, then a malicious actor may find the credit card and engage in unauthorized interactions using the credit card). Furthermore, because the user device sends multiple communications to multiple devices (e.g., via separate authenticated secure communication systems or channels), a risk associated with one or more of the multiple communications being tampered with or altered in transit may increase relative to sending a single communication to a single entity, which may lead to information integrity issues and/or information security issues, among other examples).

Some implementations described herein provide a system for enabling authenticated secure communications across different devices. For example, the system may enable (e.g., via a secure gateway device and/or a platform executing on the secure gateway device) authenticated secure communications across a user device associated with a user, the secure gateway device associated with the system, and multiple server devices associated with multiple entities. As an example, the user device may provide, and the secure gateway device may receive, a first authenticated secure communication that triggers the secure gateway device to provide a second authenticated secure communication (e.g., that is based on information associated with the first authenticated secure communication) to server devices associated with respective entities from the multiple entities.

In some implementations, the second authenticated secure communication may indicate a request for each of the multiple entities to perform an action (e.g., an action to be performed via the server devices associated with the multiple entities and based on the information indicated by the first authenticated secure communication). In this way, the system may enable the user to indicate (e.g., via the user device) a request for an action to be performed by multiple entities (e.g., via the server devices) via a communication (e.g., via a first authenticated secure communication provided to the secure gateway device that triggers the secure gateway device to provide the second authenticated secure communication to the server devices associated with the multiple entities).

In some implementations, the authenticated secure communications may be associated with account information associated with one or more accounts associated with the user and the multiple entities, as described in more detail elsewhere herein. As an example, the account information may include personal contact information associated with the user (e.g., a name, a mailing address, a telephone number, an email address, and/or a social security number), identifiers of the one or more accounts (e.g., account names, account types, and/or account numbers), financial and/or credit card information associated with the user and/or the one or more accounts (e.g., a card number, a bank routing number, a bank identifier, a cardholder identifier, expiration information, and/or a credential), governmental service information associated with the user (e.g., a government-issued identification number and/or a government-issued passport number), payment information associated with the interactions associated with the user and/or associated with the one or more accounts (e.g., a payment amount, a renewal cost, a renewal date, and/or an expiration date), and/or notification information associated with the one or more accounts, among other examples.

In some implementations, the secure gateway device may use the platform to provide a graphical user interface (GUI) associated with inputting the account information associated with the one or more accounts associated with the user and respective entities from the one or more entities. For example, the user device may present the GUI of the platform for display to the user of the user device. As an example, the secure gateway device may receive, from the user device, an indication of the account information that is input via the GUI, as described in more detail elsewhere herein.

In some implementations, the secure gateway device may authenticate the account information and/or the one or more entities via the platform, as described in more detail elsewhere herein. For example, the secure gateway device may verify an identity associated with the user device (e.g., using multi-factor authentication techniques) to authenticate the account information. As another example, the secure gateway device may verify an identity associated with a server device associated with the entity to authenticate the entity.

In some implementations, the secure gateway device may store (e.g., in a database) the account information in a manner that enables the account information to be used (e.g., by the secure gateway device) to configure a set of action options. An action option may indicate a request for an action to be performed by one or more server devices. In some implementations, the secure gateway device may classify the account information into one or more account information types associated with one or more account types of the one or more accounts (e.g., based on account types indicated by the account information), as described in more detail elsewhere herein. As an example, the secure gateway device may generate a set of action options based on one more account information types indicated by the account information. In other words, the set of action options may be based on the one or more account types of the one or more accounts, as described in more detail elsewhere here.

For example, an action option associated with a subscription account (e.g., a media streaming subscription account managed through a media streaming provider) may indicate a request for a suspend action (e.g., a request for a server device associated with the media streaming provider to suspend the media streaming subscription) or a renew action (e.g., a request for the server device associated with the media streaming provider to renew the media streaming subscription account). As another example, an action option associated with a governmental service provider account (e.g., a vehicle bureau account managed through a vehicle bureau) may indicate a cancel action (e.g., a request for a server device associated with the vehicle bureau to cancel a vehicle registration associated with the vehicle bureau account). As another example, an action option associated with a service provider account (e.g., a phone plan account managed through a mobile network operator (MNO)) may indicate a transfer action (e.g., a request for a server device associated with the MNO to receive a transfer of an amount associated with the phone plan). Although the action option is described as indicating the suspend action, the renew action, the cancel action, and the transfer action, the action option may indicate any suitable action.

In some implementations, the GUI (e.g., provided by the platform) may indicate the set of action options and the user device may present the GUI of the platform for display to the user of the user device (e.g., to enable the user to view the set of action options). The secure gateway device may receive, from the user device, a user input, via the GUI, that indicates an action option from the set of action options. In some implementations, the user input may include support information associated with the action option. For example, the support information may include information that may be used to verify information associated with the action indicated by the action option.

In some implementations, the secure gateway device may provide, to a server device associated with an entity, an indication of the action option (e.g., in response to receiving the user input that indicates the action option from the set of action options). The indication of the action option (e.g., indicated by the user input and provided by the secure gateway device to the server device) may include the support information. In other words, the secure gateway device may receive, via the GUI, the user input (e.g., which indicates the action option and the support information), and the secure gateway device may include the support information in the indication of the action indication that the secure gateway device provides to the server device associated with the entity.

In some implementations, the secure gateway device may receive, from a server device associated with an entity, a confirmation communication indicating that the action has been performed. The secure gateway device may provide, to the user device, an indication that the action has been performed.

In some implementations, the secure gateway device may receive, from a server device associated with an entity, an alert message associated with a flagged account (e.g., a flagged account type). A flagged account may be an account that includes new information, unverified information, and/or information that requires additional verification (e.g., information to be provided by the user via the user device to the server device associated with the entity). For example, if the user holds an account that is managed through a credit bureau, then the credit bureau may provide an alert message indicating that the account includes new credit information and/or requesting that the user confirm that the new information is associated with the user.

In this way, some implementations described herein enable the user to indicate (e.g., via the user device) a request for an action to be performed by multiple entities via a communication (e.g., via a single authenticated secure communication provided to the secure gateway device that triggers the secure gateway device to provide a second authenticated secure communication to server devices associated with the multiple entities). Furthermore, the secure gateway device provides a scalable, flexible, and unified solution to enable authenticated secure communications across different devices, which may enable a user to request (e.g., via the user device and using an authenticated secure communication) an action (e.g., associated with sensitive account information) to be performed by multiple entities.

Additionally, because the GUI (e.g., provided by the platform) may indicate the action options and because the user device may present the GUI of the platform for display to the user of the user device, it is easier for a user to track and/or manage the accounts. Additionally, the user may quickly locate informational content of interest (e.g., one or more action options associated with multiple entities) without navigating away from the GUI and without following numerous links from the GUI. In this way, computing resources and/or network resources may be conserved by reducing an amount of navigation performed by the user. Furthermore, the systems described herein make data easier to access by enhancing a GUI to provide authenticated and secured action options for multiple entities, thereby improving a user experience, enhancing user-friendliness of a user device and the GUI.

Furthermore, by enabling the user device to trigger the secure gateway device to provide multiple authenticated communications to multiple entities via a single user input, the user device does not need to send separate communications (e.g., sent over separate communication channels) to each entity of the multiple entities to request actions to be performed by the multiple entities. This conserve resources (e.g., processing resources, memory resources, and/or network resources) that would have otherwise been used for sending separate communications to each entity of the multiple entities to request actions to be performed by the multiple entities and reduces a risk associated with sending separate communications to each entity of the multiple entities to request actions to be performed by the multiple entities.

FIGS. 1A-1F are diagrams of an example 100 associated with enabling authenticated secure communications across different devices. As shown in FIGS. 1A-1F, example 100 includes a secure gateway device, a user device, and a server device. These devices are described in more detail in connection with FIGS. 2 and 3. In some implementations, the secure gateway device and/or a platform executing on the secure gateway device may enable authenticated secure communications across the user device and multiple server devices associated with respective entities, as described in more detail elsewhere herein.

As shown in FIG. 1A, and by reference number 105, the user device may access a platform to register account information. For example, the platform may be a mobile application executing on the user device or a native application executing on the user. As another example, the platform may be a web-based application that is accessed via a web browser executing on the user device. In some implementations, the secure gateway device may use the platform to provide a GUI associated with inputting account information associated with one or more accounts associated with the user and multiple entities (e.g., as described in more detail elsewhere herein). For example, the user device may present the GUI of the platform for display to the user of the user device.

In some implementations, the user device may access the platform to register the account information associated with the one or more accounts via the platform. For example, the user device may access the platform to register account information associated with multiple credit card accounts (e.g., associated with the user and managed through respective credit card providers), multiple credit bureau accounts (e.g., associated with the user and managed through respective credit bureaus), and/or multiple subscription accounts (e.g., associated with the user and managed through respective subscription providers), among other examples. In some implementations, the secure gateway device may perform a registration procedure associated with the multiple entities associated with the user and the one or more accounts, that enables the one or more entities to be authenticated (e.g., in a similar manner as the registration procedure used to authenticate the account information as described in more detail elsewhere herein). In this way, the account information and the multiple entities associated with the secure gateway device are authenticated.

As shown by reference number 110, the secure gateway device may receive, and the user device may provide, a registration request that includes the account information. In some implementations, the secure gateway device may perform a registration procedure associated with the account information that enables the account information to be authenticated. For example, the secure gateway device may communicate with the user device to authenticate an identity of the user operating the user device (e.g., via a verification procedure). As an example, the secure gateway device may provide a one-time pin or a one-time password (OTP) to an authenticated address or phone number, which the user may be required to enter into the platform, via the GUI, to verify that the person operating the user device is associated with the one or more accounts and/or is an owner of the one or more accounts.

As shown by reference number 115, the secure gateway device may provide, and the user device may receive, a registration confirmation. As an example, the secure gateway device may provide, and the user device may receive, the registration confirmation in response to the secure gateway device receiving the account information and/or in response to authenticating the account information. As an example, the registration confirmation may indicate that the account information is successfully registered.

As shown by FIG. 1B, and by reference number 120, the secure gateway device may store (e.g., in a database) the account information. In some implementations, the account information may include user information and/or information associated with one or more account types (e.g., one or more credit card accounts, credit bureau accounts, subscription provider accounts, service provider accounts, and/or governmental service provider accounts, among other examples). For example, account information associated with one or more credit card accounts may include an account identifier (e.g., shown as "0123", "4567," and "8901" in FIG. 1B) a cardholder name, a card number (CN) (e.g., shown as "CN: 1234 5678 9012 3456," "CN: 4567, 8901, 2345, 6789," and "CN: 8901 2345 6789 0123" in FIG. 1B), an expiration date, a credit limit, a balance owed, an interest rate, a payment due date, and/or a transaction history, among other examples.

As an example, account information associated with one or more credit bureau accounts may include a credit bureau name (e.g., shown as "A1 Credit Bureau," "B1 Credit Bureau," and "C1 Credit Bureau" in FIG. 1B), an account identifier (e.g., shown as "1122," "2233," and "3344" in FIG. 1B), a credit score, a payment history, outstanding debt information, legal action information, credit inquiries, and/ or public records (e.g., a tax lien), among other examples. As another example, account information associated with one or more service provider accounts may include a service provider name, an account identifier, an account holder name, account holder contact information, a service type (e.g., electricity service, gas service, and/or water service, among other examples), an account number, billing cycle information, a payment due date, payment information, and/or payment history information, among other examples.

As another example, account information associated with one or more subscription provider accounts may include a subscription provider name, (e.g., shown as "Best Movies," "Classic TV," and "Satellite Radio" in FIG. 1B), an account identifier (e.g., shown as "9988," "8877," and "7766" in FIG. 1B), account holder name, account holder contact information, a subscription type, a subscription level (e.g., standard or premium), a subscription start date, a subscription end date, billing cycle information, payment information, and/or payment history information. As another example, account information associated with one or more governmental service provider accounts may include a governmental service provider name, an account identifier, an account holder name, account holder information, an account number, billing cycle information, payment information, and/or payment history information, among other examples. Thus, in some implementations, the secure gateway device may classify the account information into one or more account types and/or may otherwise associate the account information with the one or more account types.

In some implementations, the secure gateway device may store the account information in a manner that enables the account information to be used (e.g., by the secure gateway device) to configure a set of action options. An action option may indicate a request for an action to be performed by one or more server devices associated with one or more entities. As an example, the action option may indicate a request for an action to be performed by server devices associated with respective credit card providers that are associated with the user and respective credit card accounts, server devices associated with respective credit bureaus associated with the user and respective credit bureau accounts, and/or server devices associated with respective subscription providers associated with the user and respective subscription accounts, among other examples.

For example, an action option associated with a subscription account (e.g., a media streaming subscription account managed through an a media streaming provider) may indicate a request for a suspend action (e.g., a request for a server device associated with the media streaming provider to suspend the media streaming subscription) or a renew action (e.g., a request for the server device associated with the media streaming provider to renew the media streaming subscription account), among other examples. As another example, an action option associated with a governmental service provider account (e.g., a vehicle bureau account managed through a vehicle bureau) may indicate a cancel action (e.g., a request for a server device associated with the vehicle bureau to cancel a vehicle registration associated with the vehicle bureau account), among other examples.

As another example, an action option associated with a service provider account (e.g., a phone plan account managed through an MNO) may indicate a transfer action (e.g., a request for a server device associated with the MNO to receive a transfer of an amount associated with the phone plan). Although the action option is described as indicating the suspend action, the renew action, the cancel action, and the transfer action, the action option(s) may indicate any suitable action.

In some implementations, each action option may be associated with a data schema (e.g., a unique data schema) and/or a data structure (e.g., a unique data structure). For example, each action option may be associated with a unique data schema and/or a unique data structure that may be used to differentiate between different categories of communications (e.g., that are associated with different account types). The unique data schema and/or the unique data structure may indicate (e.g., via metadata) data elements, data formats, and/or data contents, among other examples, which enable communications associated with the different categories of communications to be exchanged accurately and securely.

As an example, each action option associated with a first account type (e.g., a credit card account) may be associated with a first unique data schema, each action option associated with a second account type (e.g., a credit bureau account) may be associated with a second unique data schema, and/or each action option associated with a third account type (e.g., a service provider account) may be associated with a third unique data schema. The first unique data schema may be used to provide and/or receive communications associated with each action option that is associated with the first account type, the second unique data schema may be used to provide and/or receive communications associated with each action option that is associated with the second account type, and/or the third unique data schema may be used to provide and/or receive communications associated with each action option that is associated with the third account type.

In this way, communications associated with each action option may be exchanged (e.g., between and/or among the user device, the secure gateway device, and/or the one or more server devices) accurately and securely (e.g., because the communications associated with each action option may be exchanged only according to the unique data schema and/or the unique data structure). In other words, the user device, the secure gateway device, and/or the one or more server devices may exchange communications associated with action options only if the communications are exchanged using the correct unique data schemas and/or the correct unique data structures. In some implementations, the GUI (e.g., provided by the platform) may indicate the set of action options and the user device may present the GUI of the platform for display to the user of the user device (e.g., to enable the user to view the set of action options), as described in more detail elsewhere herein.

As shown by reference number 125, the secure gateway device may establish a secure gateway (e.g., one or more secure channels) to enable authenticated secure communications to be exchanged between and/or among the user device, the secure gateway device, and the one or more server devices associated with the one or more entities associated with the platform. A secure gateway may be a secure and/or controlled communication channel between and/or among the user device, the secure gateway device, and the one or more server devices. For example, communications exchanged between the user device, the secure gateway device, and/or the one or more server devices may be encrypted, authenticated, and/or authorized, among other examples.

In some implementations, the secure gateway device may establish the secure gateway by performing an establishment procedure. For example, the establishment procedure may include exchanging information between and/or among the user device, the secure gateway device, and the one or more server devices. As an example, the user device, the secure gateway device, and the one or more server devices may exchange digital certificates (e.g., to authenticate one another), encryption keys (e.g., to encrypt and decrypt communications being exchanged), access and control information (e.g., to authorize and/or define allowed actions), digital signatures (e.g., to ensure authenticity and integrity of the communications being exchanged), and/or session management data (e.g., to manage and/or track communication sessions), among other examples. In this way, authenticated secure communications may be exchanged between and/or among the user device, the secure gateway device, and/or the one or more server devices (e.g., by using the secure gateway for providing and/or receiving communications between and/or among one another).

Figure 1C:
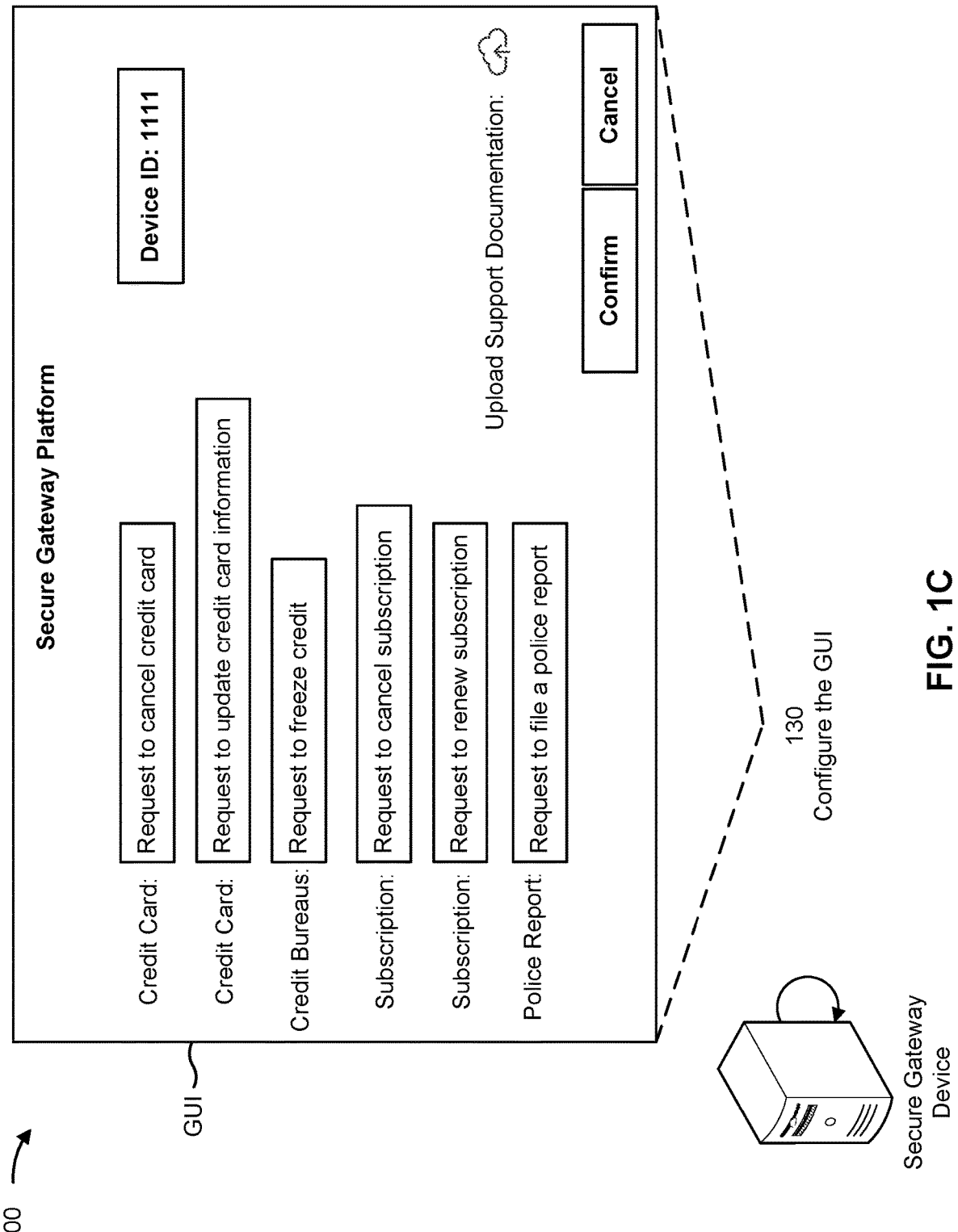

As shown in FIG. 1C, and by reference number 130, the secure gateway device may configure the GUI (e.g., to include one or more fields). For example, the secure gateway device may configure the GUI to include one or more fields associated with the action options (e.g., that are generated by the secure gateway device). As an example, the secure gateway device may configure the GUI to include a first action option (e.g., shown as "Request to cancel credit card" in FIG. 1C) associated with triggering the secure gateway device to send an indication of an action option indicating a request to multiple credit card accounts, a second action option (e.g., shown as "Request to update credit card" in FIG. 1C) associated with triggering the secure gateway device to send an indication of an action option indicating a request to the multiple credit card accounts, a third action option (e.g., shown as "Request to freeze credit" in FIG. 1C) associated with triggering the secure gateway device to send an indication of an action option indicating a request to multiple credit bureau accounts, a fourth action option (e.g., shown as "Request to cancel subscription" in FIG. 1C) associated with triggering the secure gateway device to send an indication of an action option indicating a request to multiple subscription providers, a fifth action option (e.g., shown as "Request to renew subscription" in FIG. 1C) associated with triggering the secure gateway device to send an indication of an action option indicating a request to the multiple subscription providers, and/or a sixth action option (e.g., shown as "Request to file a police report" in FIG. 1C) associated with triggering the secure gateway device to send an indication of an action option indicating a request to a governmental service provide (e.g., a police department), among other examples.

As another example, the secure gateway device may configure the GUI to include a field associated with inputting support information (e.g., shown as "Upload Support Documentation" in FIG. 1C) associated with providing support information associated with one or more action options that the user indicates (e.g., via the user device as described in more detail elsewhere herein). In some implementations, the user device may provide (e.g., to the secure gateway device), a user input, via the GUI, that indicates one or more action options from the set of action options and/or that indicates the support information associated with the one or more action options indicated by the user input.

As an example, if the user input indicates an action option associated with indicating a cancel action (e.g., a request for a server device associated with a vehicle bureau to cancel a vehicle registration associated with the vehicle bureau account), then the user input may include support documentation that indicates a reason for indicating the cancel action and/or information that provides authorization for the cancel action to be performed. In this way, because the GUI (e.g., provided by the platform) indicates the action options and because the user device presents the GUI of the platform for display to the user of the user device, it is easier for a user to track and/or manage the accounts. Additionally, the user may quickly locate informational content of interest (e.g., one or more action options associated with multiple entities) without navigating away from the GUI and without following numerous links from the GUI. In this way, computing resources and/or network resources may be conserved by reducing an amount of navigation performed by the user. Furthermore, the systems described herein make data easier to access by enhancing a GUI to provide authenticated and secured action options for multiple entities, thereby improving a user experience, enhancing user-friendliness of a user device and the GUI.

Figure 1D:
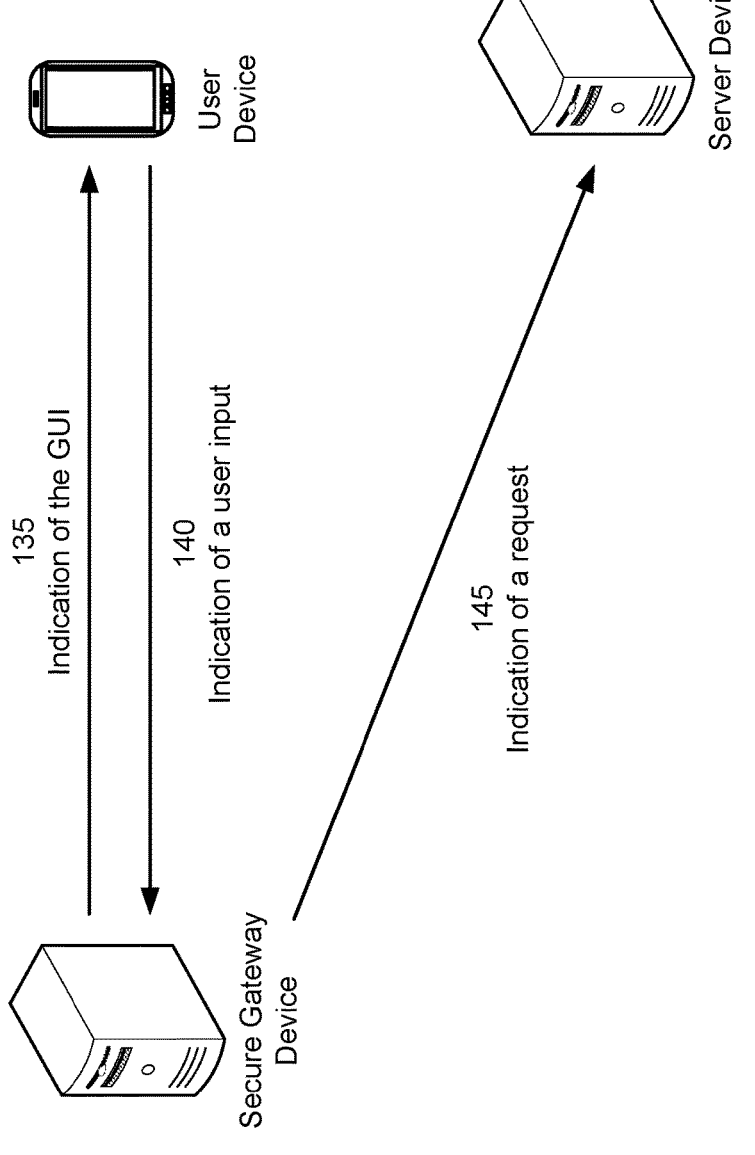

As shown in FIG. 1D, and by reference number 135, the secure gateway device may provide, and the user device may receive, an indication of the GUI. For example the GUI (e.g., provided by the platform) may indicate the set of action options and the user device may present the GUI of the platform for display to the user of the user device (e.g., to enable the user to view the set of action options). For example, the secure gateway device may provide, and the user device may receive, presentation information associated with the GUI. The presentation information may identify content for the GUI that is to be provided for presentation by the user device. For example, the presentation information may identify content for a document object of the GUI. The document object may be associated with a document object model (DOM) that includes code for generating the document object (e.g., the GUI).

As shown by reference number 140, the secure gateway device may receive, from the user device, a user input, via the GUI, that indicates an action option from the set of action options. For example, the user may interact with the GUI (e.g., provided for display via the user device) to provide the user input. As another example, the user input may be a communication (e.g., an utterance and/or a text-based message) provided by the user as an input to the GUI.

As an example, if a credit card associated with the user is stolen (e.g., by a malicious actor), then the user may utilize the user device to provide, and the secure gateway device may receive, a user input, via the GUI, that indicates the first action option (e.g., to trigger the secure gateway device to send a request to cancel the stolen credit card associated with the user to server devices associated with the multiple credit card providers), the third action option (e.g., to trigger the secure gateway device to send a request to freeze the credit associated with the user to server devices associated with the multiple credit bureau accounts), the sixth action option (e.g., to trigger the secure gateway device to send a request to file a police report associated with the stolen credit card associated with the user, and/or support information indicating information associated with the stolen credit card associated with the user, among other examples.

As another example, if the user desires to renew subscriptions associated with multiple subscription accounts managed through multiple subscription providers, then the user may use the user device to provide, and the secure gateway device may receive, a user input, via the GUI, that indicates the fifth action option (e.g., to trigger the secure gateway device to send a request to renew the subscription to server devices associated with the multiple subscription providers. In this way, the user may indicate (e.g., via the user device) a request for an action to be performed by multiple entities via a communication (e.g., via a single authenticated secure communication provided to the secure gateway device that triggers the secure gateway device to provide a second authenticated secure communication to server devices associated with the multiple entities).

As shown by reference number 145, the secure gateway device may provide, and the server device may receive, an indication of the request. Although a single server device is shown in FIG. 1D, the user input via the GUI may trigger the secure gateway device to provide multiple authenticated communications (e.g., to multiple server devices) via the secure gateway. As an example, if the secure gateway device receives, from the user device via the GUI, a user input that indicates the first action option (e.g., associated with a request to cancel a stolen credit card associated with the user), the third action option (e.g., associated with a request to freeze the credit associated with the user), the sixth action option (e.g., associated with a request to file a police report associated with the stolen credit card associated with the user), and support information indicating information associated with the stolen credit card associated with the user, then the secure gateway device may provide an indication of the first action option (e.g., indicating a request to cancel the credit card) to server devices associated with respective credit card providers), an indication of the second action option (e.g., indicating a request to freeze the credit associated with the user) to server devices associated with respective credit bureaus, an indication of the third action option (e.g., indicating a request to file a police report and the support information indicating information associated with the stolen credit card associated with the user) to a server device associated with a police department, among other examples.

Figure 1E:
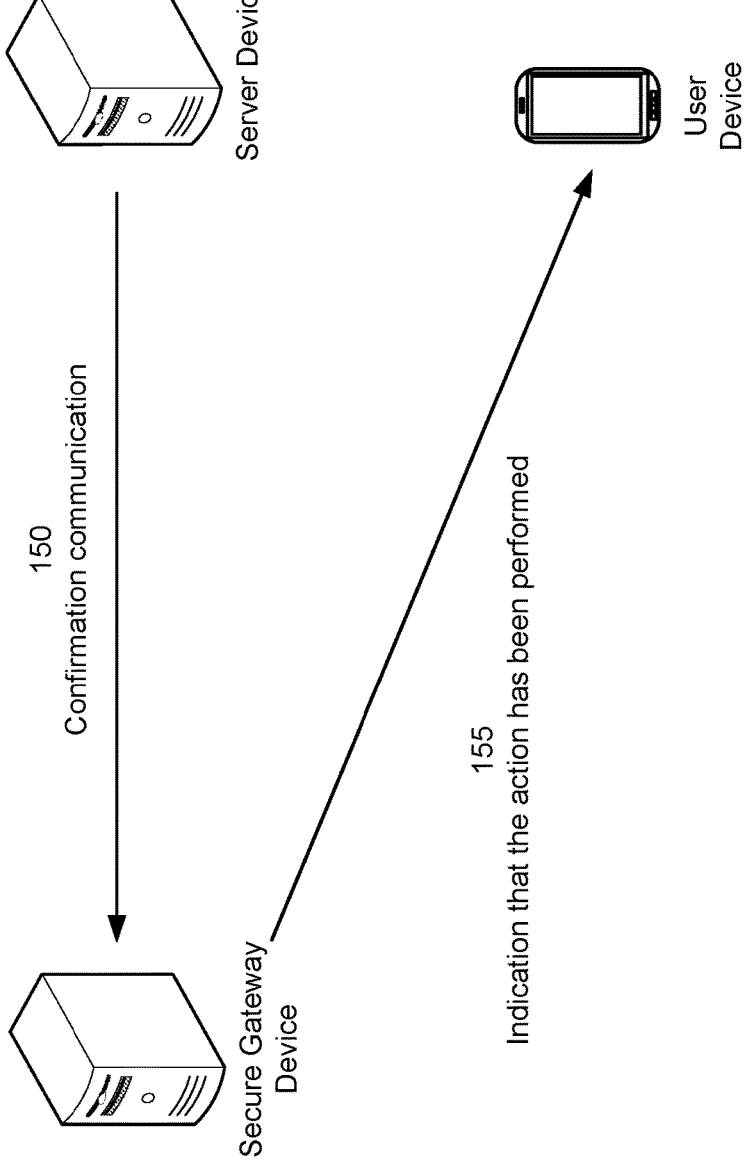

As shown in FIG. 1E, and by reference number 150, the secure gateway device may receive, and the server device may provide, a confirmation communication (e.g., indicating that the action has been performed). As an example, a server device associated with an entity may perform an action in response to receiving (e.g., from the secure gateway device) an indication of the action option. For example, the server devices associated with the multiple credit card companies may perform an action (e.g., cancel a credit card associated with the user) in response to receiving an indication of the first action option (e.g., indicating the request to cancel the credit card associated with the user), the server devices associated with the multiple credit bureaus may perform an action (freeze the credit associated with the user) in response to receiving an indication of the third action option (e.g., indicating a request to freeze the credit associated with the user), the server devices associated with the police department may perform an action (e.g., file a police report) in response to receiving an indication of the sixth action option and the support information (e.g., associated with information to be included in the police report), among other examples.

As shown by reference number 155, the secure gateway device may provide, and the user device may receive, an indication that the action has been performed. For example, the secure gateway device may provide, and the user device may receive, the indication that the action has been performed in response to the secure gateway device receiving a communication that indicates that the action is complete (e.g., that a credit card has been canceled, that credit associated with the user has been frozen, and/or that a subscription has been renewed, among other examples).

Figure 1F:
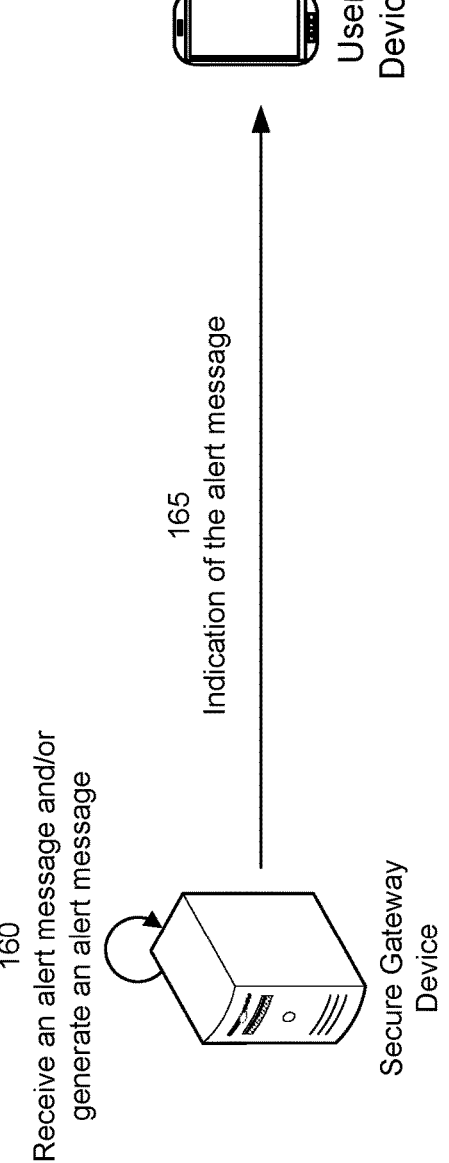

As shown in FIG. 1F, and by reference number 160, the secure gateway device may receive an alert message and/or generate an alert message. In some implementations, the secure gateway device may receive, and a server device associated with an entity may provide, the alert message (e.g., associated with a flagged account, as described in more detail elsewhere herein). As an example, if the server device is associated with a credit bureau, then the server device associated with the credit bureau may provide, and the secure gateway device may receive, an alert message indicating that a credit bureau account associated with the user includes new credit information and that requests that the user confirm that the new information is associated with the user.

In some implementations, the secure gateway device may generate an alert message (e.g., to alert the user of potentially fraudulent activity associated with the user based on location information associated with the user and/or the user device). For example, the secure gateway device may determine a first location (e.g., associated with an interaction that is associated with at least one of the user or the user device) and a second location (e.g., associated with a location of the user device). As an example, the secure gateway device may receive (e.g., from an interaction backend system) historical interaction records associated with interactions associated with the user and/or the user device. The historical interaction records may include metadata that indicates a location associated with each historical interaction. In some implementations, the secure gateway device may determine a location associated with a most recent historical interaction based on the metadata associated with a most recent historical interaction record associated with the user and/or the user device.

In some implementations, the secure gateway device may provide, and the user device may receive, a request for a current location of the user device. The user device may provide, and the secure gateway device may receive, a communication that includes a current location of the user device (e.g., indicated via latitude and longitude coordinates obtained by a positioning system of the user device). In some implementations, the secure gateway device may compare the location associated with the most recent historical interaction of the user and/or the user device and the location of the user device (e.g., indicated by the communication including the current location of the user device) to determine whether a distance between the location associated with the most recent historical interaction and the location of the user device satisfy a proximity threshold.

In some implementations, the secure gateway device may generate the alert message based on determining that the distance between the location associated with the most recent historical interaction and the location of the user device satisfies the proximity threshold (e.g., to alert the user of potentially fraudulent activity based on a location of the user device being a threshold distance away from the location associated with the most recent historical interaction associated with the user and/or the user device). As an example, if a malicious actor obtains a credit card associated with the user (e.g., after the user loses the credit card and travels a distance away from a location where the credit card is lost) and uses the credit card to engage in an unauthorized interaction, then the secure gateway device may generate an alert message (e.g., based on determining that the between the location associated with the most recent historical interaction and the location of the user device satisfies the proximity threshold) that indicates that potentially fraudulent activity associated with the user may have occurred.

As shown by reference number 165, the secure gateway device may provide, and the user device may receive, an indication of the alert message. For example, the secure gateway device may provide, and the user device may receive, the indication of the alert message in response to the secure gateway device receiving the alert message from the server device associated with the entity (e.g., to alert the user of the new information and the request for verification associated with the new credit information). As another example, the secure gateway device may provide, and the user device may receive, the indication of the alert message in response to the secure gateway device determining that the between the location associated with the most recent historical interaction and the location of the user device satisfies the proximity threshold (e.g., to alert the user of potentially fraudulent activity associated with the user).

In this way, some implementations described herein enable the user to indicate (e.g., via the user device) a request for an action to be performed by multiple entities via a communication (e.g., via a single authenticated secure communication provided to the secure gateway device that triggers the secure gateway device to provide a second authenticated secure communication to server devices associated with the multiple entities). Furthermore, the secure gateway device provides a scalable, flexible, and unified solution to enable authenticated secure communications across different devices, which may enable a user to request (e.g., via the user device and using an authenticated secure communication) an action (e.g., associated with sensitive account information) to be performed by multiple entities associated with an account associated with the user.

Additionally, because the GUI (e.g., provided by the platform) may indicate the action options and because the user device may present the GUI of the platform for display to the user of the user device, it is easier for a user to track and/or manage the accounts. Furthermore, by enabling the user device to trigger the secure gateway device to provide multiple authenticated communications to multiple entities via a single user input, the user device does not need to send separate communications (e.g., sent over separate communication channels) to each entity of the multiple entities to request actions to be performed by the multiple entities. This conserve resources (e.g., processing resources, memory resources, and/or network resources) that would have otherwise been used for sending separate communications to each entity of the multiple entities to request actions to be performed by the multiple entities and reduces a risk associated with sending separate communications to each entity of the multiple entities to request actions to be performed by the multiple entities.

As indicated above, FIGS. 1A-1F are provided as an example. Other examples may differ from what is described with regard to FIGS. 1A-1F.

Figure 2:
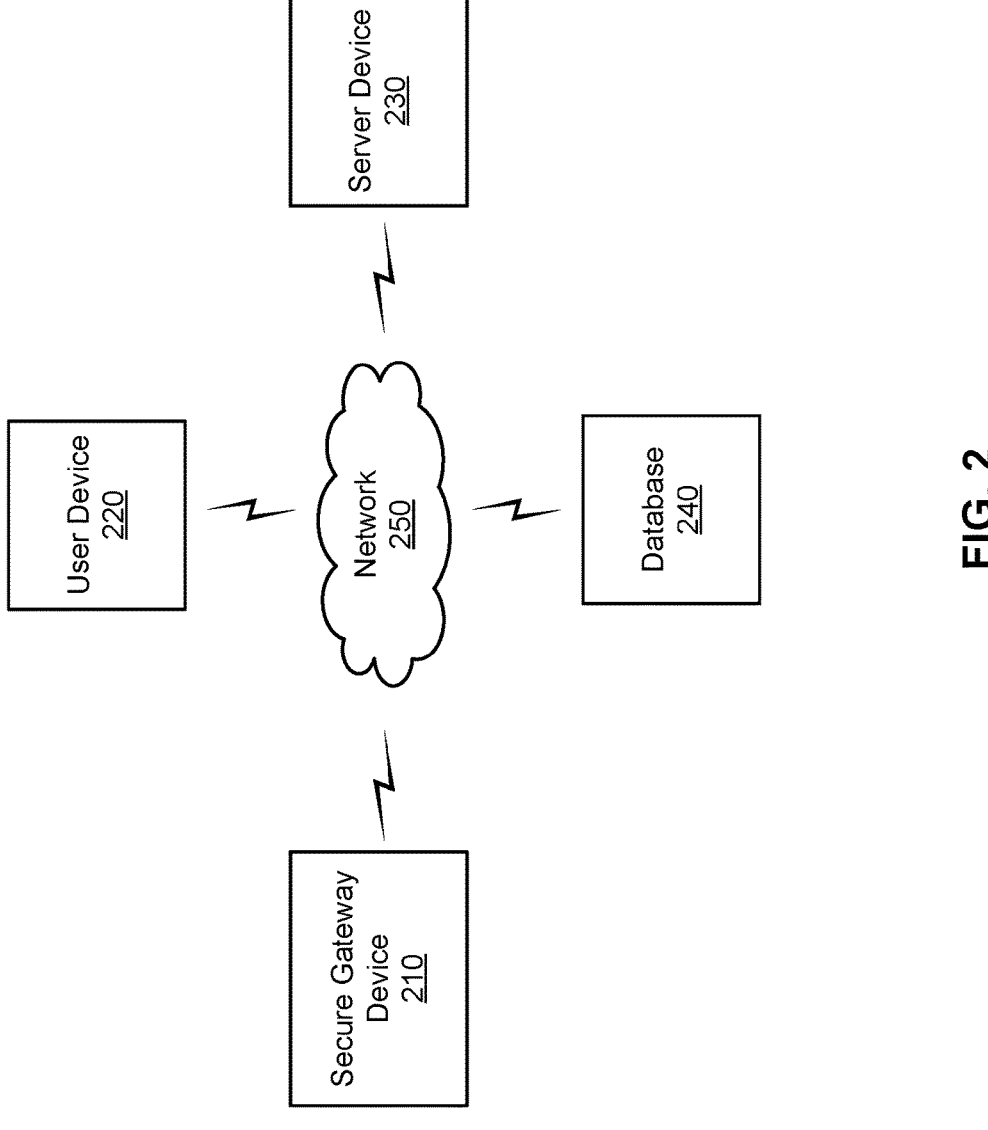
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a secure gateway device 210, a user device 220, one or more server devices 230, a database 240, and a network 250. Devices of environment 200 may interconnect via wired connections, wireless connections, or a combination of wired and wireless connections.

The server device 230 may include one or more devices capable of receiving, generating, storing, processing, providing, and/or routing information associated with authenticated secure communications, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The user device 220 may include one or more devices capable of receiving, generating, storing, processing, and/or providing information associated with authenticated secure communications, as described elsewhere herein. The user device 220 may include a communication device and/or a computing device. For example, the user device 220 may include a wireless communication device, a mobile phone, a user equipment, a laptop computer, a tablet computer, a desktop computer, a gaming console, a wearable communication device (e.g., a smart wristwatch, a pair of smart eyeglasses, a head mounted display, or a virtual reality headset), or a similar type of device.

The server device 230 may include one or more devices capable of receiving, generating, storing, processing, providing, and/or routing information associated with authenticated secure communications, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The database 240 may include one or more devices capable of receiving, generating, storing, processing, and/or providing information associated with authenticated secure communications, as described elsewhere herein. The database 240 may include a communication device and/or a computing device. For example, the database 240 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The database 240 may communicate with one or more other devices of environment 200, as described elsewhere herein. In some implementations, the database may store account information associated with the one or more accounts (e.g., one or more credit card accounts, credit bureau accounts, service provider accounts, subscription provider accounts, and/or governmental service provider accounts, among other examples.

The network 250 may include one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
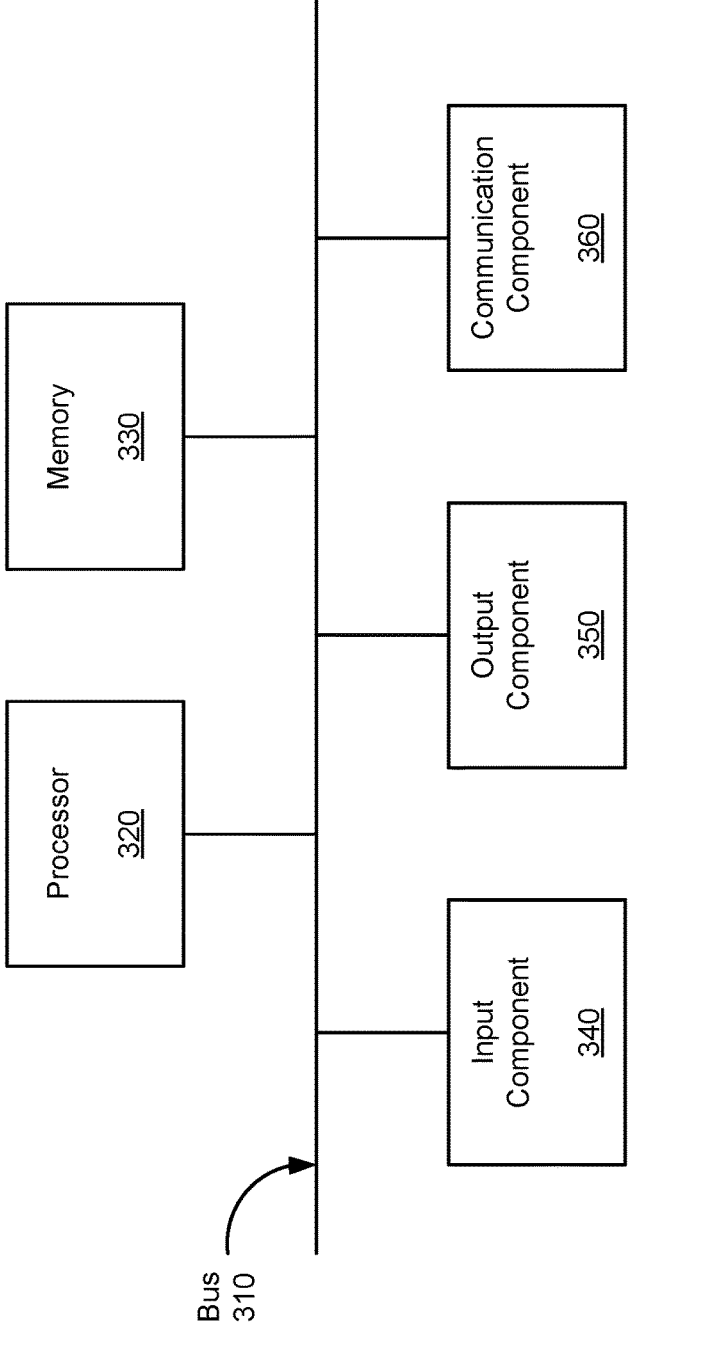
FIG. 3 is a diagram of example components of a device associated with systems and methods for enabling authenticated secure communications across different devices, in accordance with some embodiments of the present disclosure.

FIG. 3 is a diagram of example components of a device 300 associated with systems and methods for enabling authenticated secure communications across different devices. The device 300 may correspond to the secure gateway device 210, the user device 220, the server device 230, and/or the database 240. In some implementations, the secure gateway device 210, the user device 220, and/or the server device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device

300 may perform one or more functions described as being performed by another set of components of the device 300.

Figure 4:
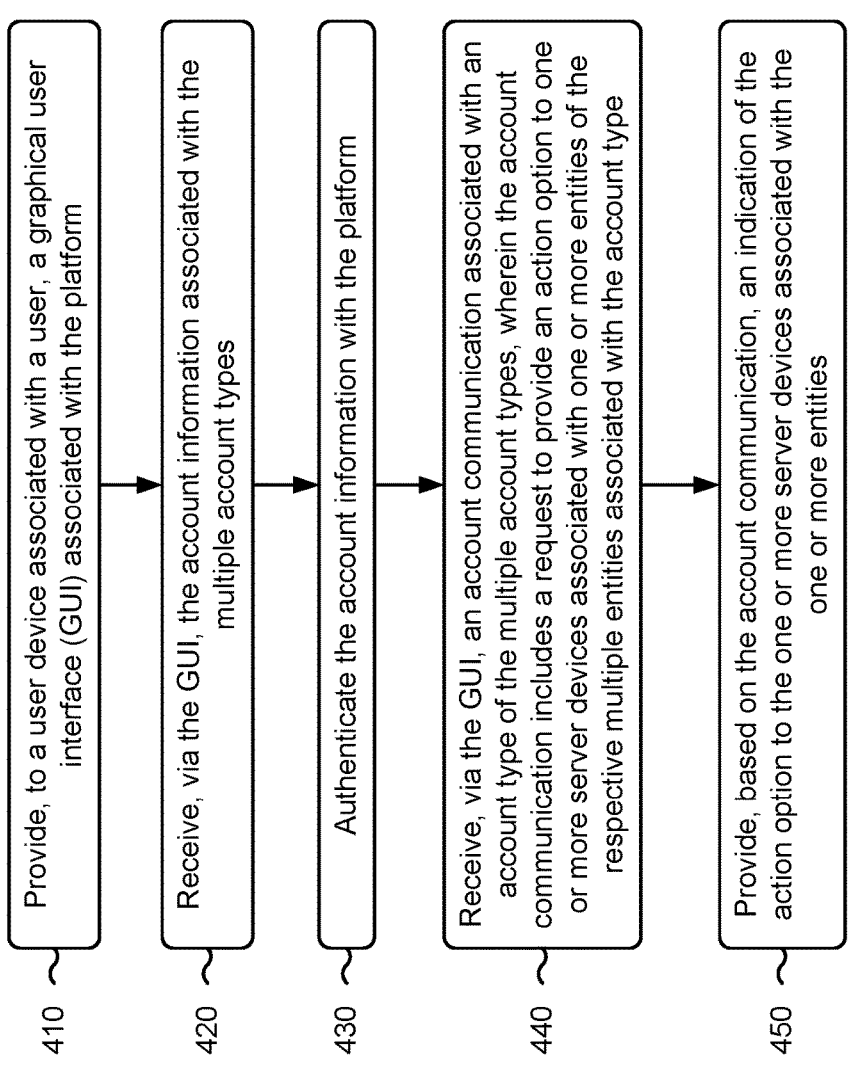
FIG. 4 is a flowchart of an example process associated with systems and methods for enabling authenticated secure communications across different devices, in accordance with some embodiments of the present disclosure.

FIG. 4 is a flowchart of an example process 400 associated with systems and methods for enabling authenticated secure communications across different devices. In some implementations, one or more process blocks of FIG. 4 may be performed by the secure gateway device 210. In some implementations, one or more process blocks of FIG. 4 may be performed by another device or a group of devices separate from or including the secure gateway device 210, such as the secure gateway device 210, the user device 220, and/or the server device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include providing, to a user device associated with a user, a GUI associated with a platform (e.g., executing on the secure gateway device 210 and/or executing on the user device 220 associated with a user) (block 410). For example, the secure gateway device 210 (e.g., using processor 320 and/or memory 330) may provide, to the user device 220 associated with a user, the GUI associated with the platform, as described above in connection with reference number 110 of FIG. 1A. As an example, the user device 220 may access a platform to register account information (e.g., associated with the multiple account types of multiple accounts associated with the user and respective multiple entities). For example, the platform may be a mobile application executing on the user device, a native application executing on the user, or a web-based application that is accessed via a web browser executing on the user device. In some implementations, the secure gateway device 210 may use the platform to provide the GUI, which includes one or more fields associated with inputting the account information. For example, the secure gateway device 210 may provide the GUI, via the platform, to the user device 220 for display to the user of the user device.

As further shown in FIG. 4, process 400 may include receiving, via the GUI, an indication of the account information associated with the multiple account types (block 420). For example, the secure gateway device 210 (e.g., using processor 320, memory 330, input component 340, and/or communication component 360) may receive, via the GUI, an indication of the account information associated with the multiple account types, as described above in connection with reference number 110 of FIG. 1A. As an example, the secure gateway device 210 may receive, and the user device 220 may provide, a registration request that includes the account information. The account information may indicate the multiple account types (e.g., credit card accounts, credit bureau accounts, subscription provider accounts, service provider accounts, and/or governmental service provider accounts, among other examples).

As further shown in FIG. 4, process 400 may include authenticating the account information with the platform (block 430). For example, the secure gateway device 210 (e.g., using processor 320 and/or memory 330) may authenticate the account information with the platform, as described above in connection with reference number 110 of FIG. 1A. As an example, the secure gateway device 210 may perform a registration procedure associated with the account information that enables the account information to be authenticated. For example, the secure gateway device 210 may communicate with the user device 220 to authenticate an identity of the user operating the user device 220 (e.g., via a verification procedure).

As further shown in FIG. 4, process 400 may include receiving, via the GUI, an account communication associated with an account type of the multiple account types (block 440). For example, the secure gateway device 210 (e.g., using processor 320, memory 330, input component 340, and/or communication component 360) may receive, via the GUI, an account communication associated with an account type of the multiple account types, as described above in connection with reference number 140 of FIG. 1D. As an example, the secure gateway device 210 may receive, from the user device 220, a user input, via the GUI, that indicates an action option from the set of action options associated with an account type of the multiple account types. For example, the user may interact with the GUI (e.g., provided for display via the user device 220) to provide the user input. As another example, the user input may be a communication (e.g., an utterance and/or a text-based message) provided by the user as an input to the GUI. In some implementations, the account communication may include a request to provide an indication of the action option to the one or more server devices associated with the one or more entities of the respective multiple entities (e.g., associated with the account type indicated by the account communication).

As further shown in FIG. 4, process 400 may include providing, based on the account communication, the indication of the action option to the one or more server devices associated with the one or more entities (block 450). For example, the secure gateway device 210 (e.g., using processor 320 and/or memory 330) may provide, based on the account communication, the indication of the action option to the one or more server devices associated with the one or more entities, as described above in connection with reference number 145 of FIG. 1D. As an example, if the user input (e.g., received by the secure gateway device 210) indicates a first action option (e.g., associated with a request to cancel a stolen credit card associated with the user), a second action option (e.g., associated with a request to freeze the credit associated with the user), and a third action option (e.g., associated with a request to file a police report associated with the stolen credit card associated with the user), then the secure gateway device 210 may provide an indication of the first action option (e.g., indicating a request to cancel the credit card) to server devices associated with respective credit card providers, an indication of the second action option (e.g., indicating a request to freeze the credit associated with the user) to server devices associated with respective credit bureaus, and an indication of the third action option (e.g., indicating a request to file a police report) to a server device associated with a police department (e.g., in response to the user input via the GUI).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1F. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or,"

unless explicitly stated otherwise (e.g., if used in combination with "either" or "only one of").

What is claimed is:

1. A system comprising:
one or more memories; and
one or more processors, coupled to the one or more memories, configured to:
provide a graphical user interface (GUI) associated with enabling authenticated secure communications to be exchanged between a user device associated with a user and one or more server devices associated with one or more entities via a platform,
wherein the GUI includes one or more fields associated with inputting information associated with one or more accounts associated with the user and a set of entities from the one or more entities;
receive, from the user device, account information that is input via the GUI, wherein the account information is associated with the one or more accounts;
perform a registration procedure that enables the account information to be authenticated via the platform;
classify the account information into one or more account information types associated with one or more account types of the one or more accounts and generate, based on the classification, a set of executable action options;
provide, to the user device, an indication of the set of executable action options, for display via the GUI;
receive, from the user device, a user input, via the GUI, that indicates a selection of one or more action options from the set of executable action options; and
provide, via an authenticated secure communication, to the one or more server devices associated with the one or more entities, an indication of the selection.

2. The system of claim 1, wherein the one or more processors are further configured to:
authenticate the one or more entities via the platform.

3. The system of claim 1, wherein the one or more processors are further configured to:
receive, from a server device of the one or more server devices associated with the one or more entities, an alert message associated with an account of the one or more accounts; and
provide, to the user device, an indication of the alert message associated with the account.

4. The system of claim 1, wherein the one or more action options include one or more requests for one or more actions to be performed by the one or more server devices associated with the one or more entities, and wherein the one or more actions include at least one of:
a suspend action,
a cancel action,
a renew action, or
a transfer action.

5. The system of claim 1, wherein the user input includes an indication of support information associated with the one or more action options, and wherein the support information is included in the indication of the one or more action options.

6. The system of claim 1, wherein the indication of the account information associated with the one or more accounts identifies one or more account types of the one or more accounts, and wherein the set of executable action options are based on the one or more account types of the one or more accounts.

7. A method for enabling authenticated secure communications across different devices via a platform, comprising:
providing, by a device and to a user device associated with a user, a graphical user interface (GUI) associated with the platform,
wherein the GUI includes one or more fields associated with inputting account information associated with multiple account types associated with the user and respective multiple entities;
receiving, by the device and via the GUI, the account information associated with the multiple account types;
authenticating, by the device, the account information with the platform;
classifying, by the device, the account information into one or more account information types associated with one or more account types of the multiple account types;
generating, by the device and based on the authenticated account information, a set of executable action options;
providing, by the device and to the user device, an indication of the set of executable action options, for display via the GUI, based on the account information;
receiving, by the device and via the GUI, an account communication associated with an account type of the multiple account types,
wherein the account communication includes a request to provide an executable action option to one or more server devices associated with one or more entities of the respective multiple entities associated with the account type; and
providing, by the device and based on the account communication, an indication of the executable action option to the one or more server devices associated with the one or more entities.

8. The method of claim 7, further comprising:
authenticating the respective multiple entities.

9. The method of claim 7, wherein the executable action option includes a request for the one or more server devices associated with the one or more entities to perform an action, and wherein the action includes at least one of:
a suspend action,
a cancel action,
a renew action, or
a transfer action.

10. The method of claim 7, wherein the executable action option includes a request for the one or more server devices associated with the one or more entities to perform an action, and the method further comprising:
receiving, from the one or more server devices associated with the one or more entities, a confirmation communication indicating that the action has been performed.

11. The method of claim 7, further comprising:
receiving, from a server device associated with an entity of the respective multiple entities, an alert message,
wherein the alert message is associated with a flagged account type of the multiple account types associated with the entity of the respective multiple entities; and
providing, to the user device, an indication of the alert message.

12. The method of claim 7, further comprising:
determining a first location and a second location,
wherein the first location is associated with an interaction that is associated with at least one of the user or the user device, and wherein the second location is associated with a location of the user device;

comparing the first location and the second location to determine whether a distance between the first location and the second location satisfies a proximity threshold; and providing, to the user device, an alert indication based on the distance satisfying the proximity threshold.

13. A non-transitory computer-readable medium storing a set of instructions, the set of instructions comprising:

one or more instructions that, when executed by one or more processors of a device, cause the device to:

receive, from a user device of a user, account information associated with multiple account types associated with the user and multiple entities;

authenticate the account information;

classify, by the device, the account information into one or more account information types associated with one or more account types of the multiple account types;

generate, by the device and based on the authenticated account information, a set of executable action options associated with the multiple account types and the multiple entities;

provide, by the device and to the user device, an indication of the set of executable action options, for display via the GUI, based on the account information;

receive, from the user device, an account communication associated with an account type of the multiple account types indicating a request to provide an action option from the set of executable action options, to one or more server devices that are associated with one or more entities of the multiple entities associated with the account type; and provide the action option to the one or more server devices of the one or more entities of the multiple entities associated with the account type.

14. The non-transitory computer-readable medium of claim 13, wherein each action option from the set of executable action options is associated with at least one of:

a unique data schema, or a unique data structure.

15. The non-transitory computer-readable medium of claim 13, wherein the action option includes a request for the one or more server devices associated with the one or more entities of the multiple entities associated with the account type to perform an action, and wherein the action includes at least one of:

a suspend action, a cancel action, a renew action, or a transfer action.

16. The non-transitory computer-readable medium of claim 13, wherein the one or more instructions, when executed by the one or more processors, further cause the device to:

authenticate the multiple entities.

17. The non-transitory computer-readable medium of claim 13, wherein the action option includes a request for the one or more server devices associated with the one or more entities of the multiple entities associated with the account type to perform an action, and wherein the one or more instructions, when executed by the one or more processors, further cause the device to:

receive, from the one or more server devices, a confirmation communication indicating that the action has been performed; and provide, to the user device, an indication that the action has been performed.

18. The non-transitory computer-readable medium of claim 13, wherein the one or more instructions, when executed by the one or more processors, further cause the device to:

receive, from a server device associated with an entity of the multiple entities associated with an account having a flagged account type of the multiple account types, an alert message; and provide, to the user device, an indication of the alert message associated with the account.

19. The non-transitory computer-readable medium of claim 13, wherein the one or more instructions, when executed by the one or more processors, further cause the device to:

determine a first location of the user device;

determine a second location associated with a historical interaction associated with at least one of the user or the user device;

compare the first location and the second location to determine whether a distance between the first location and the second location satisfies a proximity threshold; and provide, to the user device, an alert indication based on the distance satisfying the proximity threshold.

20. The non-transitory computer-readable medium of claim 13, wherein the one or more instructions, when executed by the one or more processors, further cause the device to:

receive, via the graphical user interface and from the user device, a single user input indicating a selection of a plurality of executable action options corresponding to a plurality of account types associated with a plurality of entities; and in response to the single user input, provide, via authenticated secure communications, indications of the respective executable action options to a plurality of server devices associated with the respective plurality of entities.

* * * * *